(No Model.)

O. H. & A. F. PIEPER.
RHEOSTAT.

No. 586,864.

2 Sheets—Sheet 1.

Patented July 20, 1897.

Witnesses.

Inventors
Oscar H. Pieper
Alphonse F. Pieper
by Church & Church
their Attorneys (No Model.)
O. H. & A. F. PIEPER.
RHEOSTAT.
No. 586,864.　　　　　　　Patented July 20, 1897.
2 Sheets—Sheet 2.
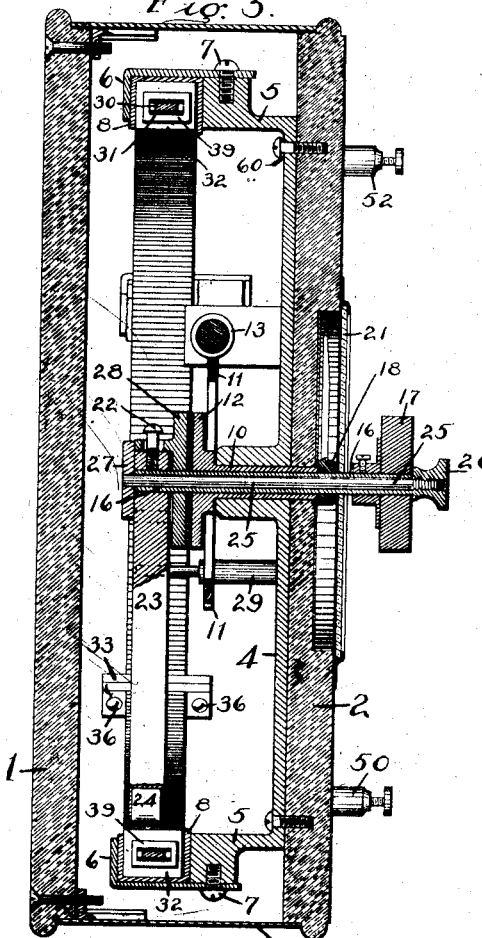
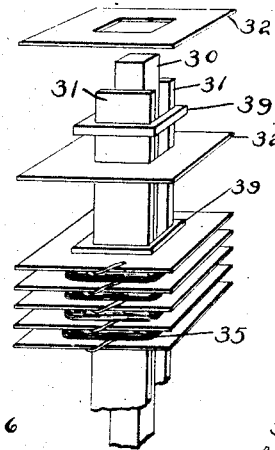
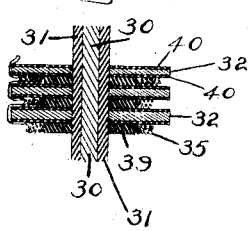
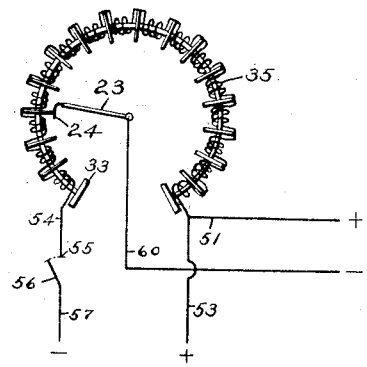
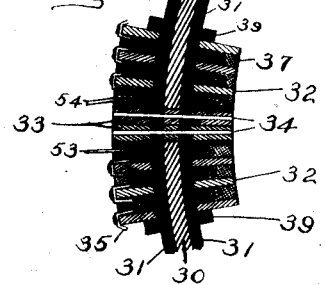
Witnesses.
Inventors

UNITED STATES PATENT OFFICE.

OSCAR H. PIEPER AND ALPHONSE F. PIEPER, OF ROCHESTER, NEW YORK.

RHEOSTAT.

SPECIFICATION forming part of Letters Patent No. 586,864, dated July 20, 1897.

Application filed March 23, 1897. Serial No. 628,910. (No model.)

*To all whom it may concern:*

Be it known that we, OSCAR H. PIEPER and ALPHONSE F. PIEPER, of Rochester, in the county of Monroe and State of New York, have invented certain new and useful Improvements in Rheostats; and we do hereby declare the following to be a full, clear, and exact description of the same, reference being had to the accompanying drawings, forming a part of this specification, and to the reference-numerals marked thereon.

Our present invention has for its object to provide an improved rheostat particularly adapted for use in connection with a cataphoric apparatus used in dental operations to convey a local anesthetic to the gum or nerve centers liable to be affected by the operation. In using an apparatus of this nature it is desirable not only that means be provided for the accurate regulation of the electric current, but that the operator be advised of the amount of current applied in order that the best results may be obtained.

With the object in view of providing a rheostat which will fulfil the conditions required in a cataphoric appliance and one that can, if desired, be used for other purposes our invention consists in certain improvements hereinafter described, the novel features being pointed out particularly in the claims at the end of this specification.

Figure 1:
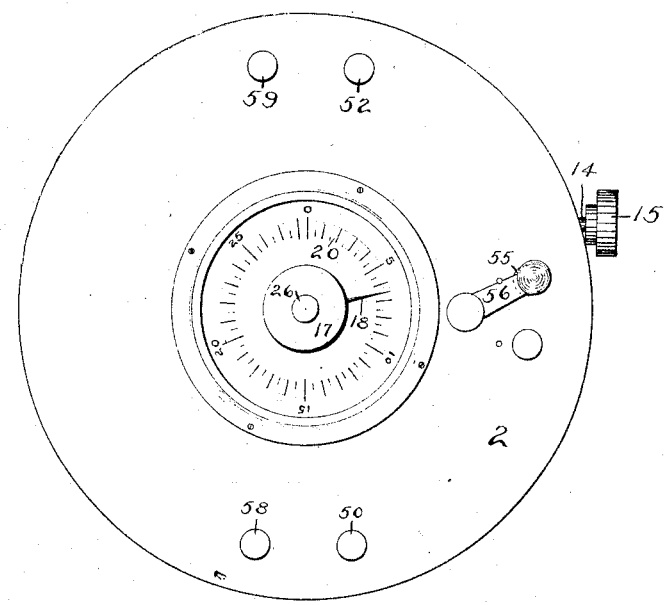
Figure 2:
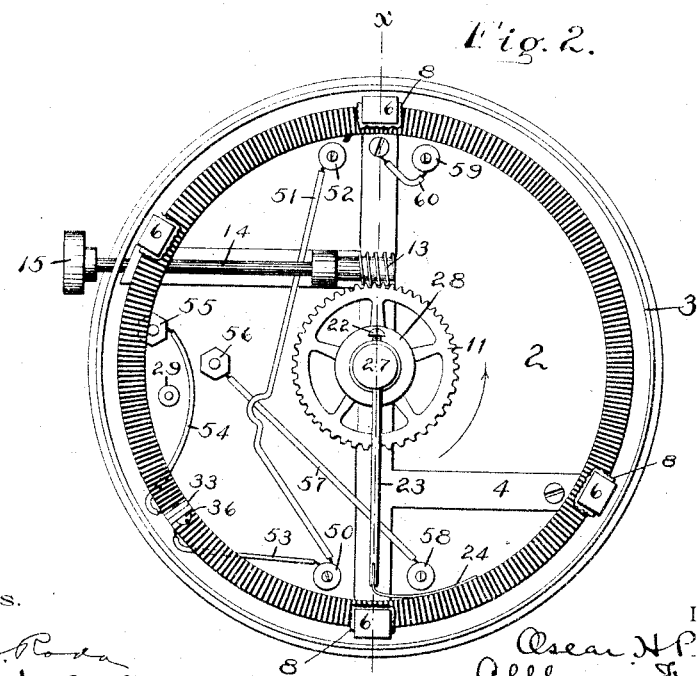

In the drawings, Figure 1 is a front elevation of our improved rheostat; Fig. 2, a bottom plan view of the same with the bottom plate removed; Fig. 3, a sectional view on the line $x\, x$ of Fig. 2; Fig. 4, a perspective view showing the manner of constructing the resistance-coils and contacts; Fig. 5, a sectional view of a portion of the resistance-coils and supports; Fig. 6, a similar view of a modification; Fig. 7, a diagrammatic view of the circuits.

Similar reference-numerals in the several figures indicate similar parts.

In carrying out our invention we provide a suitable case, preferably circular and embodying the back plate 1 and the front plate or cover 2, of insulating material, as hard rubber, and casing 3, connecting the two parts. Secured to the rear side of the front plate 2 is a frame or spider 4, having arms 5, to which the resistance-coils and contact-plates are secured by means of brackets 6, projecting over the edge of the coils and supports and adjustably secured to the arms 5 by screws 7, suitable insulating material 8 being applied between the brackets and frame, as shown particularly in Fig. 3.

Extending through the center of the casing and journaled in a central bearing formed in the spider 4 is a sleeve 10, having a worm-wheel 11 formed upon or secured thereto and a friction-disk 12 at its inner end, said worm-wheel coöperating with a worm 13 on a shaft 14, mounted in suitable bearings in the spider and extending out through the casing, its outer end being provided with an operating handle or knob 15.

Inside of the sleeve 10 is a tubular arbor or sleeve 16, having secured to its outer portion an operating knob or handle 17 and inside of this an index or pointer 18, coöperating with a scale 20 on a suitable dial, preferably under a glass 21. The inner end of the arbor 16 is connected by a screw 22 with an arm 23, carrying at its outer or free end a contact-spring 24, adapted to wipe over the contact-plates of the coils supported upon the arms 5 of the spider.

29 indicates a stop for arresting the arm 23 when it has reached the end of the resistance-coil and the pointer is at zero.

Extending through the arbor 16 is a rod 25, having a threaded outer end, upon which is a nut 26, and provided at its inner end with a head 27, adapted to coöperate with a friction-plate 28, mounted upon the sleeve 16 and permitted a movement thereon longitudinally of said sleeve, but caused to rotate with it by means of the screw 22, which passes through the slot therein, as shown in Fig. 3.

The construction of the parts just described is such that when the nut 26 is loosened the sleeve 16 may be manipulated by the knob 17, carrying with it the index 18, the friction-disk 28, and the arm 23, which latter may be readily moved to cause the contact-spring to pass over the contact-plates and, as will be explained, place more or less resistance in the circuit. When, however, the nut 26 is tightened, the disks 28 and 12 will be drawn into contact, and as the latter carries the worm-wheel 11 the arm 23 can only be operated by a manipulation of the operating-knob 15 on the worm-shaft, so that the resistance in the circuit can only be gradually varied, which is very desirable when the device is used for cataphoric purposes.

It will be seen that the operator may by connecting the disks 12 and 28 vary the resistance in the circuit gradually, the exact amount of current passing being indicated upon the dial 20 and, if desired, may return the index and switch arm gradually to first position, or he may unscrew the nut 26 and by the manipulation of the knob 17 return the instrument to normal position rapidly.

It is evident that as far as the operation of the parts just described is concerned the particular construction of the resistance-coils and contacts is immaterial, but it is eminently desirable that it be of such construction that it is readily applicable to the general form of instrument described and capable of being made at a reasonable price. These results we find are best accomplished by building up on a suitable ring coils of relatively fine insulated wire, between which coils are placed the contacts with which the movable arm of the rheostat coöperates, and the construction employed is shown particularly in Figs. 4, 5, and 6, the base or core being composed of a rod 30, preferably of metal—such, for instance, as copper—upon opposite sides of which are placed strips 31 of insulating material, as vulcanized fiber, slightly greater in width than the rod 30, and upon the core thus formed are placed, alternately, metal plates 32 and insulating and separating washers 39, preferably of vulcanized fiber, until a strip of a length equal to the circumference of the circle described by the contact-spring 24 has been formed, and then the end plates 33 are secured to the ends of the strip 31 by means of pins 34, as shown in Fig. 5 or otherwise.

The resistance-coils 35 are composed of fine insulated wire wound upon the washers 33 between the plates 32 and are all formed from a continuous piece, the requisite number of turns to form the desired resistance or unit being arranged between the two adjacent plates 32. Then the wire is passed over the rear side of said plate and into the space between the next two plates, this being continued until all the spaces between the contact-plates are filled with the desired number of turns. To connect the separate coils with the contact-plates, it is only necessary to remove the insulation from that portion of the wire passing over the outer sides of the plates 32 with a file or sandpaper and solder the bare wire to the plates, as shown particularly in Fig. 5. The coil-strip is then bent into circular form and the plates 33 connected by screws 36. The circle is then trued up and, if desired, the inner faces of the plates are ground to make a smooth contact-surface over which the spring contact-arm 24 moves.

If desired, the spaces between the contact-plates 32 and the outside of the coil may be filled with insulating material 37, or the ring as a whole may be embedded in insulating material with only the edges of the plates projecting, thereby forming a continuous surface, or in some instances it may be desirable to place insulating-plates 40, of mica or other material, on opposite sides of the plates 32, as shown in Fig. 6, which would prevent the formation of a spark between the plates if currents of high voltage were employed.

One of the line-terminals from the generator is connected to binding-post 50, which is connected by wire 51 with binding-post 52, from which latter a wire or other suitable conductor leads to the cataphoric instrument or other translating device. From the binding-post 50 a conductor 53 leads to one end of the resistance-coil, and the other end of the coil is connected by a wire 54 with a switch-contact 55, with which coöperates a movable switch 56, connected by a wire 57 with the post 58, to which the other terminal of the generator-circuit is connected. The binding-post 59, forming the other terminal of the circuit containing the translating device, is connected by a wire 60 with the spider or frame 4, and the latter is connected, through the arm 23 and contact-spring 24, with one or the other of the contact-plates of the rheostat.

From the circuit arrangement shown in Fig. 7 it will be seen that as the arm 23 is moved around either by the operating-knob 15 or the knob 17 in the direction of the arrow, Fig. 2, the resistance is gradually diminished and there is a gradual increase in the current passing to the patient or the translating device, the index and scale indicating the current in volts rather than the number of ohms interposed as resistance.

It will be understood that this apparatus can be used for any purpose for which a rheostat is desired, and the manner of constructing the resistance-coils can be employed in connection with other forms of apparatus, whether the contacts of said coils be arranged in circular form or otherwise, but the construction is particularly adapted to such an arrangement as herein shown, because the coils and their support can be readily formed while said support is straight, if desired, and then it may be bent into circular or other form and the space between the contact-plates filled with insulating material, as may be desired.

We claim as our invention—

1. In a rheostat, the combination with a support or core and a series of conducting contact-plates insulated from the support and having apertures through which the support passes, of a continuous insulated wire wound upon the support between the plates of the series and electrically connected to the plates at the points of crossing from one space to the next, and a contact-arm coöperating with the exposed edges of the plates, substantially as described.

2. In a rheostat, the combination with a support or core, a series of conducting contact-plates insulated from the support and having apertures through which the support passes, and a series of insulated spacing-washers on the support and between the contact-plates, of a continuous insulated wire wound upon the washers between the plates, and electrically connected to the plates at the points of crossing the plates, and a contact-arm coöperating with the exposed edges of the plates, substantially as described.

3. In a rheostat, the combination with the divided ring support or core, a series of contact-plates having apertures through which the ring passes, of a continuous insulated wire wound upon the support between the plates, and electrically connected to the plates at the points of crossing, and a rotary contact-arm adapted to contact successively with the exposed edges of the contact-plates, substantially as described.

4. In a rheostat, the combination with the flexible support or core, a series of contact-plates having apertures through which the support passes, and a series of washers of insulating material on the support between the plates, of a continuous insulated wire wound upon the support between the contact-plates and electrically connected to the latter at the points of crossing from one space to the next, said wire being connected to one circuit-terminal and the movable contact-arm connected to the other circuit-terminal and adapted to be moved over and contact with the edges of the plates, substantially as described.

5. In a rheostat, the combination with the rod 30, the insulating-strips 31, the contact-plates 32 and insulating-washers 39, of the continuous insulated wire 35 wound upon the washers and electrically connected with the plates 32 as it passes over them, the plates 33 at the ends of the support, and means for connecting them, and a movable contact-arm adapted to coöperate with the edges of the plates 32, substantially as described.

6. In a rheostat, the combination with a variable resistance and a movable contact-arm coöperating therewith, of an operating knob or handle connected directly with said contact-arm for actuating it, a second operating knob or handle and a slow-gear mechanism connected thereto, and a detachable clutch device between the slow-gear mechanism and the contact-arm, whereby the contact-arm may be actuated directly at high speed or indirectly at a slower speed, substantially as described.

7. In a rheostat, the combination with a variable resistance, and a movable contact-arm coöperating therewith, of an operating knob or handle connected directly with said arm, a worm-wheel, a detachable clutch device between said worm-wheel and the contact-arm, and a worm coöperating with the worm-wheel and an operating knob or handle connected thereto, substantially as described.

8. In a rheostat, the combination with a variable resistance, and the movable contact-arm, of the arbor to which the contact-arm is connected, and the operating-knob and index thereon, the scale with which the index coöperates, the worm-wheel loose on the arbor, the worm-shaft coöperating therewith having the operating knob or handle, and a clutch between the arbor and worm-wheel, substantially as described.

9. In a rheostat, the combination with the variable resistance and the movable contact-arm, of the arbor 16 to which the arm is connected having the knob 17, the worm-wheel 10 and the friction-disk 12, the worm-shaft 14 having the worm 13 and knob 15, the friction-disk 28 moving with the contact-arm, and the rod 25 having the head 27 and nut 26 for clamping the worm-wheel and arm together, substantially as described.

10. In a rheostat, the combination with the frame having the arms 5, the variable resistance embodying the coils and contact-plates mounted on the said arms, the arbor 16, the index thereon, the contact-arm 23 on the arbor, the worm-wheel connected to the arbor, the worm and the worm-shaft having the operating-knob, substantially as described.

OSCAR H. PIEPER.
ALPHONSE F. PIEPER

Witnesses:
F. F. CHURCH,
G. A. RODA.